(12) United States Patent (10) Patent No.: US 12,688,391 B2

Ueda et al. (45) Date of Patent: Jul. 21, 2026

(54) COMMUNICATION CONTROL METHOD FOR COMMUNICATION DEVICE, ITEM MANAGEMENT EQUIPMENT, AND ITEM MANAGEMENT SYSTEM

(71) Applicant: SATO HOLDINGS KABUSHIKI KAISHA, Tokyo (JP)

(72) Inventors: Yoshiyuki Ueda, Tokyo (JP); Kazuya Hirata, Tokyo (JP); Mitsutoshi Sakagami, Tokyo (JP)

(73) Assignee: SATO CORPORATION, Tokyo (JP)

( * ) Notice: Subject to any disclaimer, the term of this patent is extended or adjusted under 35 U.S.C. 154(b) by 31 days.

(21) Appl. No.: 18/845,231

(22) PCT Filed: Feb. 21, 2023

(86) PCT No.: PCT/JP2023/006261

§ 371 (c)(1),
(2) Date: Sep. 9, 2024

(87) PCT Pub. No.: WO2023/189021

PCT Pub. Date: Oct. 5, 2023

(65) Prior Publication Data

US 2025/0181875 A1 Jun. 5, 2025

(30) Foreign Application Priority Data

Mar. 31, 2022 (JP) ................................ 2022-060052

(51) Int. Cl.
*G06K 19/073* (2006.01)
*G06K 7/10* (2006.01)
(Continued)

(52) U.S. Cl.
CPC ... *G06K 19/07327* (2013.01); *G06K 7/10168* (2013.01); *G06K 19/0701* (2013.01);
(Continued)

(58) Field of Classification Search
CPC ......... G06K 19/07327; G06K 19/0717; G06K 19/077; G06K 7/10168; G06K 19/0701;
(Continued)

(56) References Cited

U.S. PATENT DOCUMENTS

| | | | | |
|---|---|---|---|---|
| 6,121,544 | A * | 9/2000 | Petsinger | G06K 19/005 |
| | | | | 150/147 |
| 7,523,870 | B2 * | 4/2009 | Lowe | A45C 11/18 |
| | | | | 242/379 |
| 7,965,190 | B2 * | 6/2011 | Maloney | G08B 13/196 |
| | | | | 340/568.1 |
| 9,898,907 | B1 * | 2/2018 | Xin | G08B 13/1427 |

(Continued)

FOREIGN PATENT DOCUMENTS

| | | |
|---|---|---|
| CA | 3025921 A1 | 6/2019 |
| EP | 2 008 255 B1 | 12/2008 |

(Continued)

OTHER PUBLICATIONS

Extended European Search Report issued in EP Appl. No. 23779051.4 dated Jun. 16, 2025.

*Primary Examiner* — John A Tweel, Jr.

(74) *Attorney, Agent, or Firm* — Foley & Lardner LLP

(57) ABSTRACT

A communication control method for a communication device includes (i) blocking communication of the communication device with a wireless device by causing a metal-containing member to be close to the communication antenna among a plurality of antennas, or by covering at least a part of the communication antenna with the metal-containing member; (ii) charging a capacitor by the communication device, based on energy acquired by an energy acquisition antenna of the communication device, regardless of whether the communication device can communicate with the wireless device, to keep a voltage of the capacitor equal to or higher than the predetermined value; and (iii) resuming communication of the communication device with the wireless device when the metal-containing member is stopped from being close to the communication antenna or (Continued)

when at least a part of the communication antenna is stopped from being covered with the metal-containing member.

10 Claims, 11 Drawing Sheets

(51) Int. Cl.

| | | |
|---|---|---|
| *G06K 19/07* | (2006.01) |
| *G06K 19/077* | (2006.01) |
| *H02J 50/00* | (2016.01) |
| *H04W 4/80* | (2018.01) |

(52) U.S. Cl.
CPC ..... *G06K 19/0708* (2013.01); *G06K 19/0709* (2013.01); *G06K 19/0717* (2013.01); *G06K 19/077* (2013.01); *H04W 4/80* (2018.02); *H02J 50/001* (2020.01)

(58) Field of Classification Search
CPC ........... G06K 19/0708; G06K 19/0709; G06K 19/07771; H02J 50/001; H04W 4/80
See application file for complete search history.

(56) References Cited

U.S. PATENT DOCUMENTS

| | | | |
|---|---|---|---|
| 10,592,862 | B1 | 3/2020 | Strom et al. |
| 2007/0229259 | A1 | 10/2007 | Irmscher et al. |
| 2010/0188221 | A1 | 7/2010 | Irmscher et al. |
| 2010/0188223 | A1 | 7/2010 | Irmscher et al. |
| 2010/0191651 | A1 | 7/2010 | Irmscher et al. |
| 2018/0053388 | A1 | 2/2018 | Xin |
| 2019/0138870 | A1 | 5/2019 | Kuzbari et al. |
| 2019/0180581 | A1 | 6/2019 | Marszalek et al. |
| 2020/0356943 | A1 | 11/2020 | Strom et al. |

FOREIGN PATENT DOCUMENTS

| | | | |
|---|---|---|---|
| JP | 2007-122266 | A | 5/2007 |
| JP | 2009-100951 | A | 5/2009 |
| JP | 2009-179969 | A | 8/2009 |
| JP | 2011-053873 | A | 3/2011 |
| JP | 2019-515405 | A | 6/2019 |
| JP | 2020-525928 | A | 8/2020 |
| JP | 2021-111165 | A | 8/2021 |
| JP | 2021-149218 | A | 9/2021 |
| WO | WO-2019/005043 | A1 | 1/2019 |
| WO | WO-2020/092512 | A2 | 5/2020 |

* cited by examiner

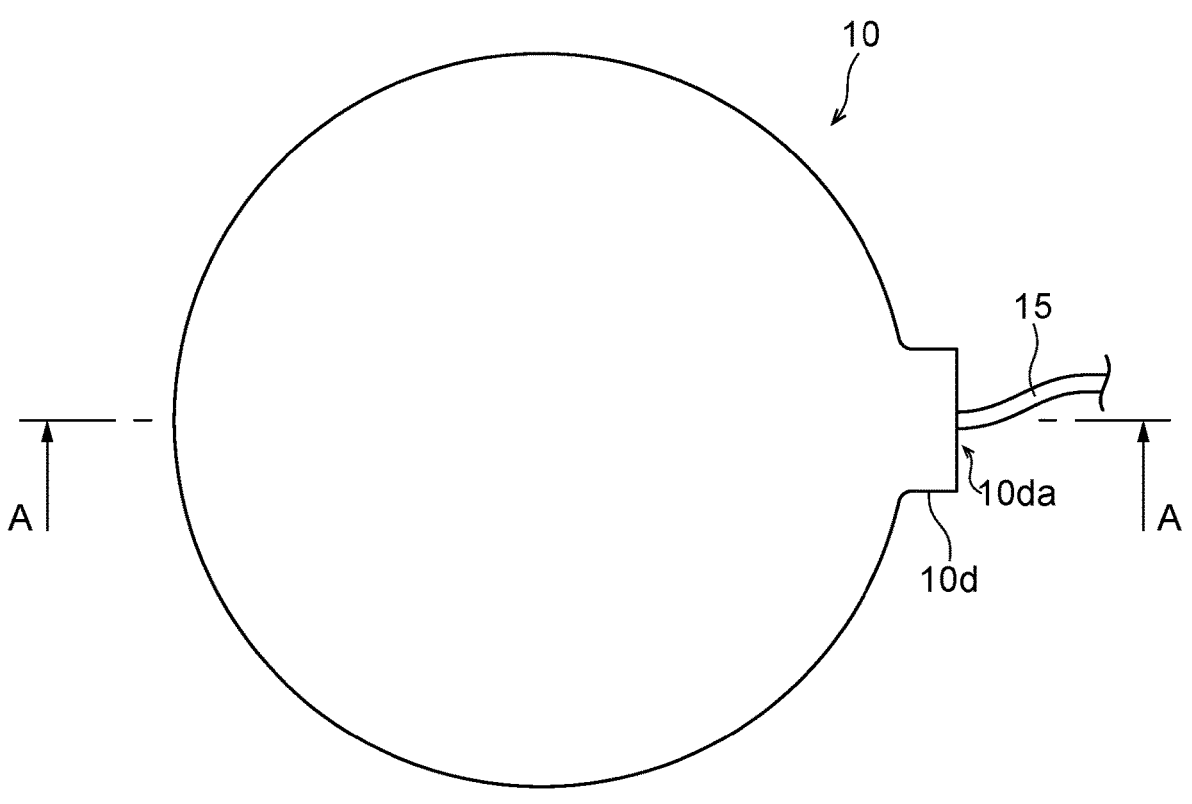
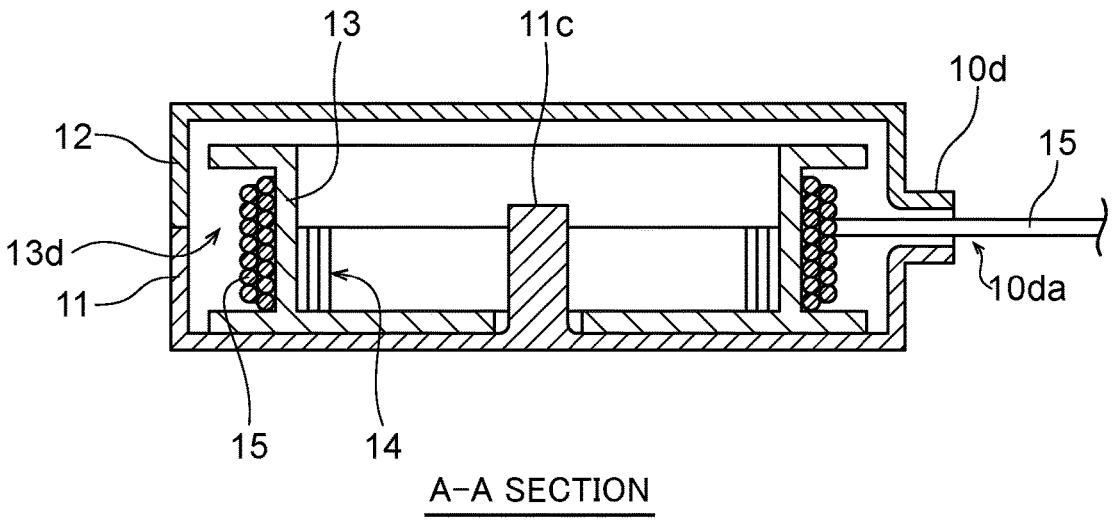
A-A SECTION
FIG.3

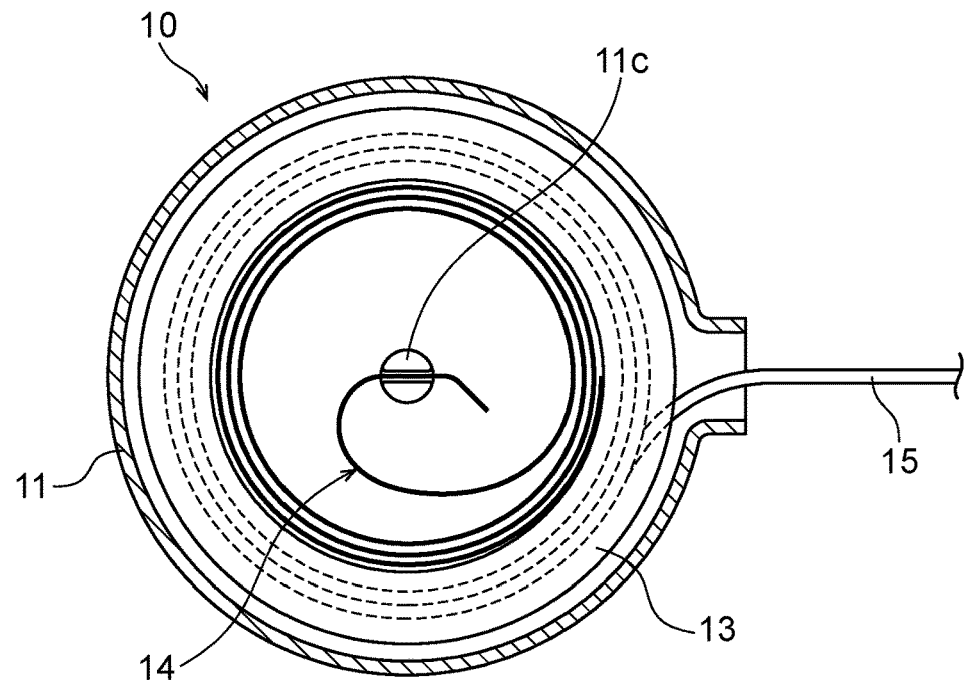
STATE WHERE CODE IS NOT PULLED OUT
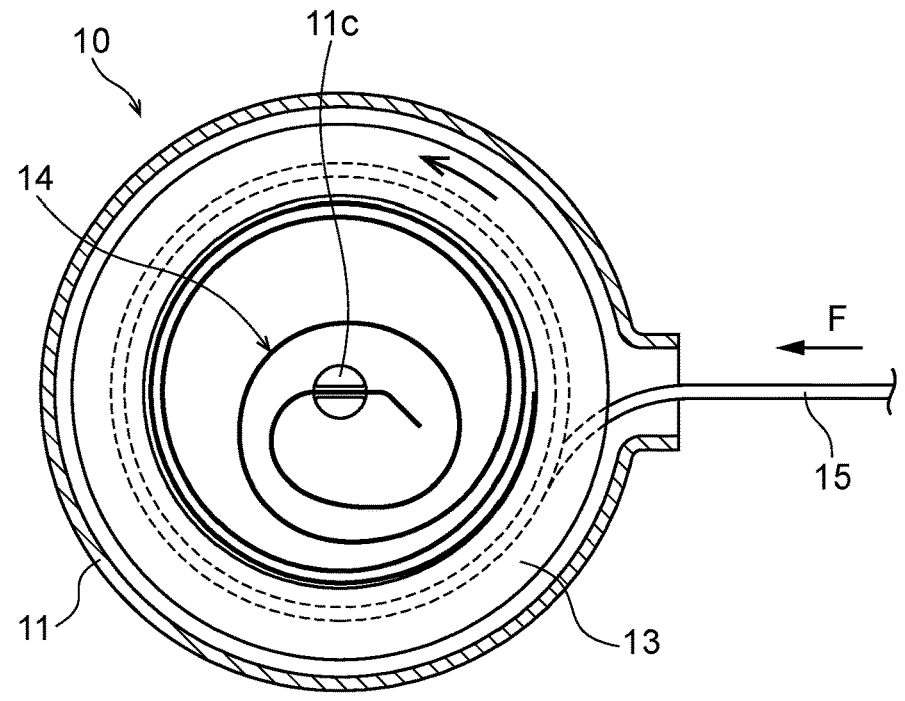
STATE WHERE CODE IS PULLED OUT        FIG.4

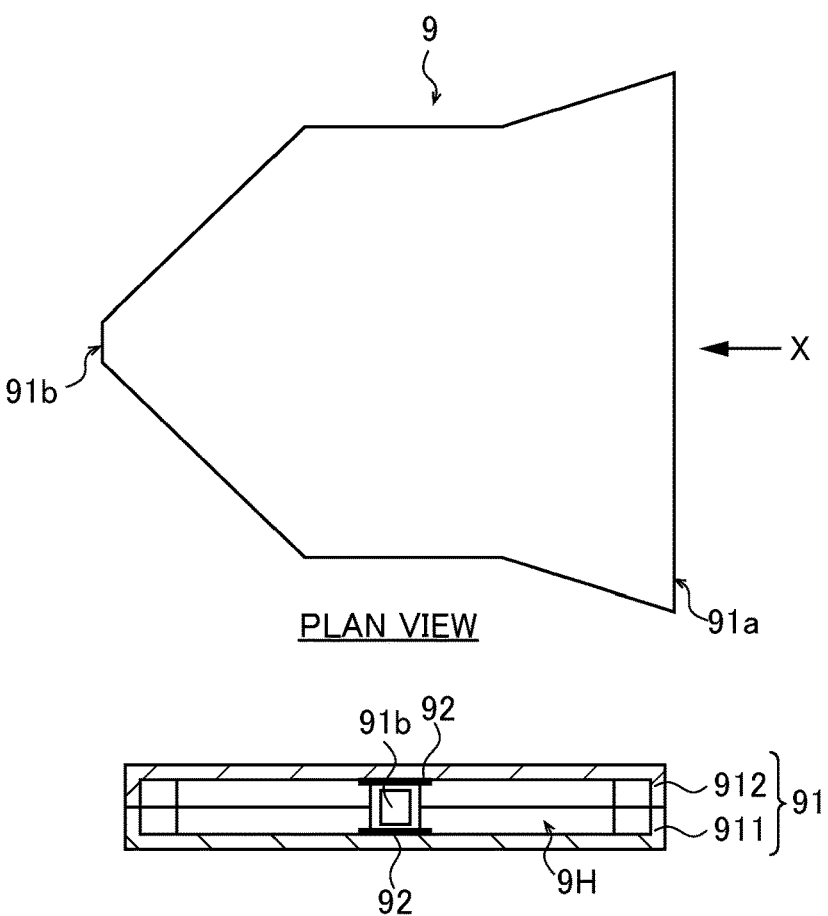
PLAN VIEW
VIEW OF ARROW X
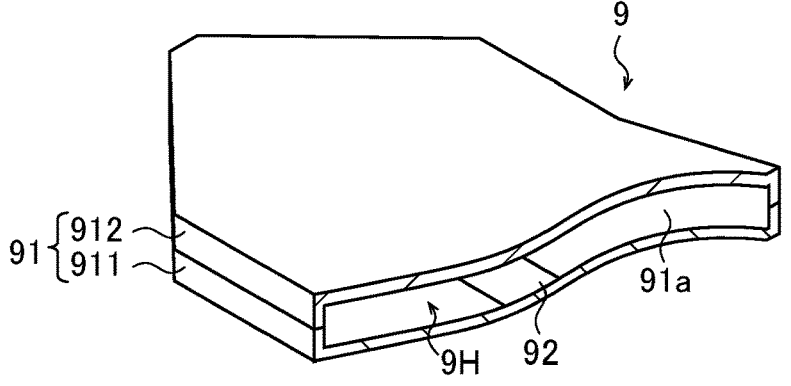
PARTIALLY CUTAWAY PERSPECTIVE VIEW
FIG.5

ENLARGED B-B CROSS-SECTIONAL VIEW

STATE WHERE CODE IS NOT PULLED OUT

STATE WHERE CODE IS PULLED OUT

COMMUNICATION CONTROL METHOD FOR COMMUNICATION DEVICE, ITEM MANAGEMENT EQUIPMENT, AND ITEM MANAGEMENT SYSTEM

FIELD

The present invention relates to a communication control method for a communication device, an item management device, and an item management system.

BACKGROUND

Energy harvesting has been conventionally known as a technique of converting, into electric power, energy that exists in the environment and whose examples include sunlight, vibration, heat, and an electromagnetic field.

For example, FIG. 3 in Japanese Patent Application Laid-Open Publication (Translation of PCT Application) No. 2020-525928 describes energy harvesting of converting a surrounding electromagnetic field into electric power. In this energy harvesting, the electromagnetic field of a predetermined frequency input from an antenna is converted into a usable AC voltage, the AC voltage is rectified to generate a DC output, and the generated DC output is supplied to an electric charge storage unit constituted by a capacitor.

BRIEF SUMMARY

Technical Problem

Incidentally, when a metal-containing member containing a metal substance and a communication device such as a wireless tag are caused to be close to each other, or when the communication device is covered with the metal-containing member, radio waves emitted by the communication device are shielded by the metal-containing member. As a result, the communication generally becomes impossible. In view of the above, the inventors of the present application have conceived the idea of detecting a specific event by shielding or un-shielding radio waves with a metal-containing member. These radio waves are emitted by a communication device that implements an energy harvesting technique of converting a surrounding electromagnetic field into electric power. Examples of the specific event include an event that a cover is placed on an item to which the communication device is attached, an event that an item coupled to the communication device is picked up, and the like.

However, the inventors have further researched the event detection to find a problem existing in responsiveness in the event detection using the communication device that implements the energy harvesting technique. That is, the problem occurs in a case where radio waves emitted by the communication device are shielded by the metal-containing member, and then, the shielding by the metal-containing member is cleared away. In that case, it takes time for radio waves to be emitted from the communication device after the shielding is cleared away, and thus, occurrence of an event cannot be detected timely.

In view of the above, an object of the present invention is to improve communication responsiveness to shielding or un-shielding against radio waves emitted by a communication device that implements an energy harvesting technique.

Solution to Problem

An aspect of the present invention provides a communication control method for a communication device that includes a plurality of antennas and a capacitor, the plurality of antennas including a communication antenna for communicating with a wireless device and an energy acquisition antenna for acquiring energy from surrounding radio waves, the capacitor being charged based on energy acquired by the energy acquisition antenna, wherein the communication device communicates with the wireless device when a voltage of the capacitor is equal to or higher than a predetermined value.

This method includes:

blocking communication of the communication device with the wireless device by causing a metal-containing member to be close to the communication antenna among the plurality of antennas, or by covering at least a part of the communication antenna with the metal-containing member;

charging the capacitor by the communication device, based on energy acquired by the energy acquisition antenna, regardless of whether the communication device can communicate with the wireless device, and thereby keeping a voltage of the capacitor equal to or higher than the predetermined value; and resuming communication of the communication device with the wireless device when the metal-containing member is stopped from being close to the communication antenna or when at least a part of the communication antenna is stopped from being covered with the metal-containing member.

Advantageous Effects

An aspect of the present invention can improve communication responsiveness to shielding or un-shielding against radio waves emitted by a communication device that implements an energy harvesting technique.

BRIEF DESCRIPTION OF DRAWINGS

FIG. 3 illustrates a structure of a cord winding device in the product management system according to one embodiment.

FIG. 4 illustrates sectional views of the cord winding device illustrated in FIG. 3, in a state where a cord is not pulled out and in a state where the cord is pulled out.

FIG. 5 illustrates a shape of an accommodation member.

DETAILED DESCRIPTION

In the present disclosure, "item" means a tangible object such as a product, a manufactured item, a semi-manufactured item (an item at an intermediate stage in course of being manufactured), or a mock-up. One example of an item cited in the following embodiments is a sales promotion product (referred to also as a point-of-sale material (POSM)).

In the present disclosure, "metal-containing member" is not limited to a member containing a single metallic element, and also encompasses a member containing a compound that includes metallic elements.

The following more specifically describes a product management system according to one embodiment with reference to the drawings, using an electric shaver as an example of a product.

In the product management system according to one embodiment, a sales promotion product (POSM) is arranged in a store in such a way as to be allowed to be tried out. The product management system is configured to automatically measure the time points and frequency at which a customer picks up the sales promotion product, thereby efficiently acquiring useful marketing information.

The sales promotion product (hereinafter, referred to simply as "product") is, but not limited to, preferably a product that customers feel like picking up and trying out. The sales promotion product is, but not limited to, an electric shaver, a digital camera, a video camera, or a smartphone, for example. The applicable products can widely encompass stationery such as a pencil case and a fountain pen, a perfume, cosmetics such as a lipstick and a foundation, a portable game console, home appliances such as a handy cleaner, a laundry softener, and even a fragrance sample.

Figure 1:
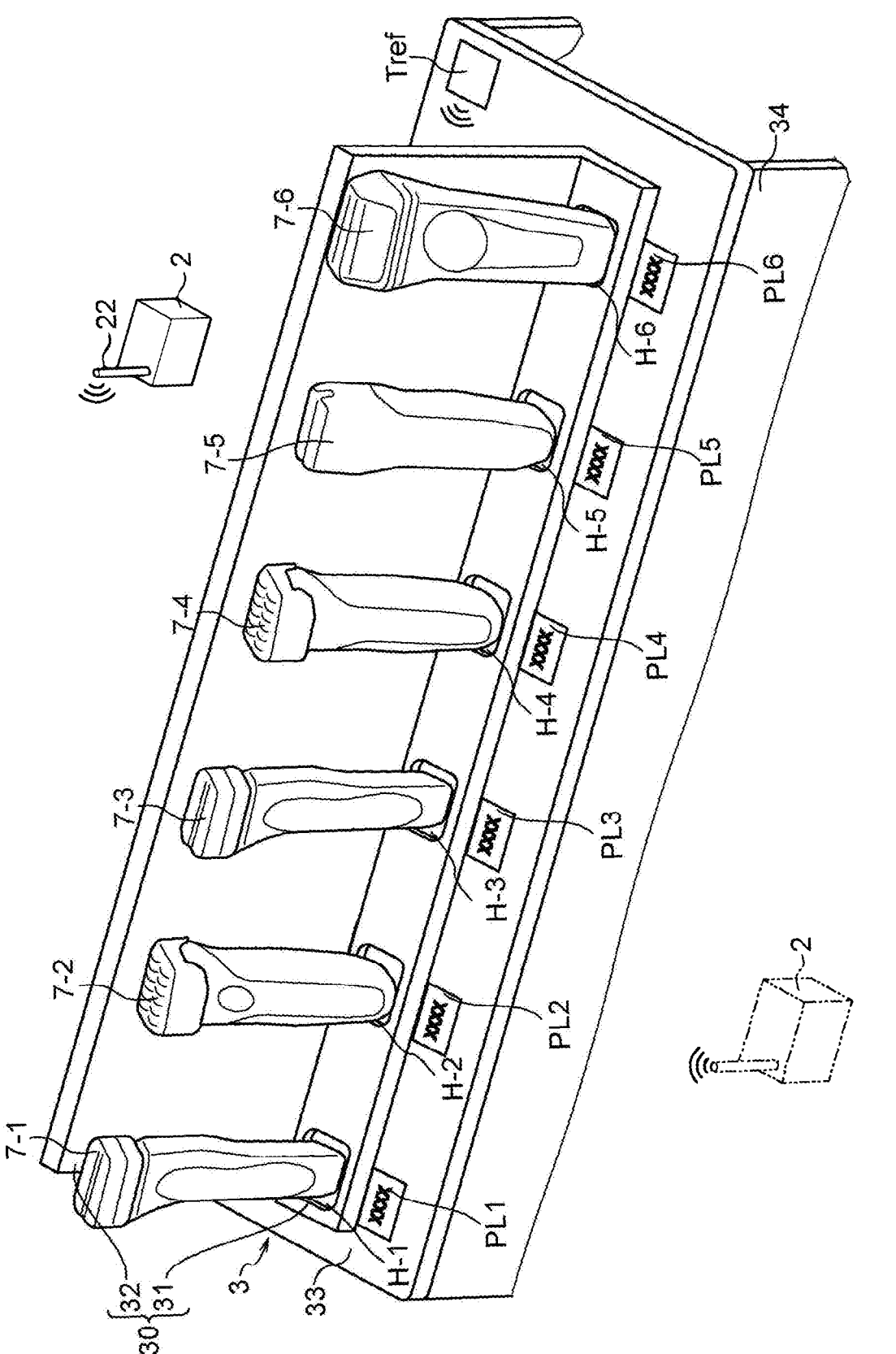
FIG. 1 illustrates an application example of a product management system according to one embodiment, and illustrates a state where products are placed on a product shelf.
Figure 2:
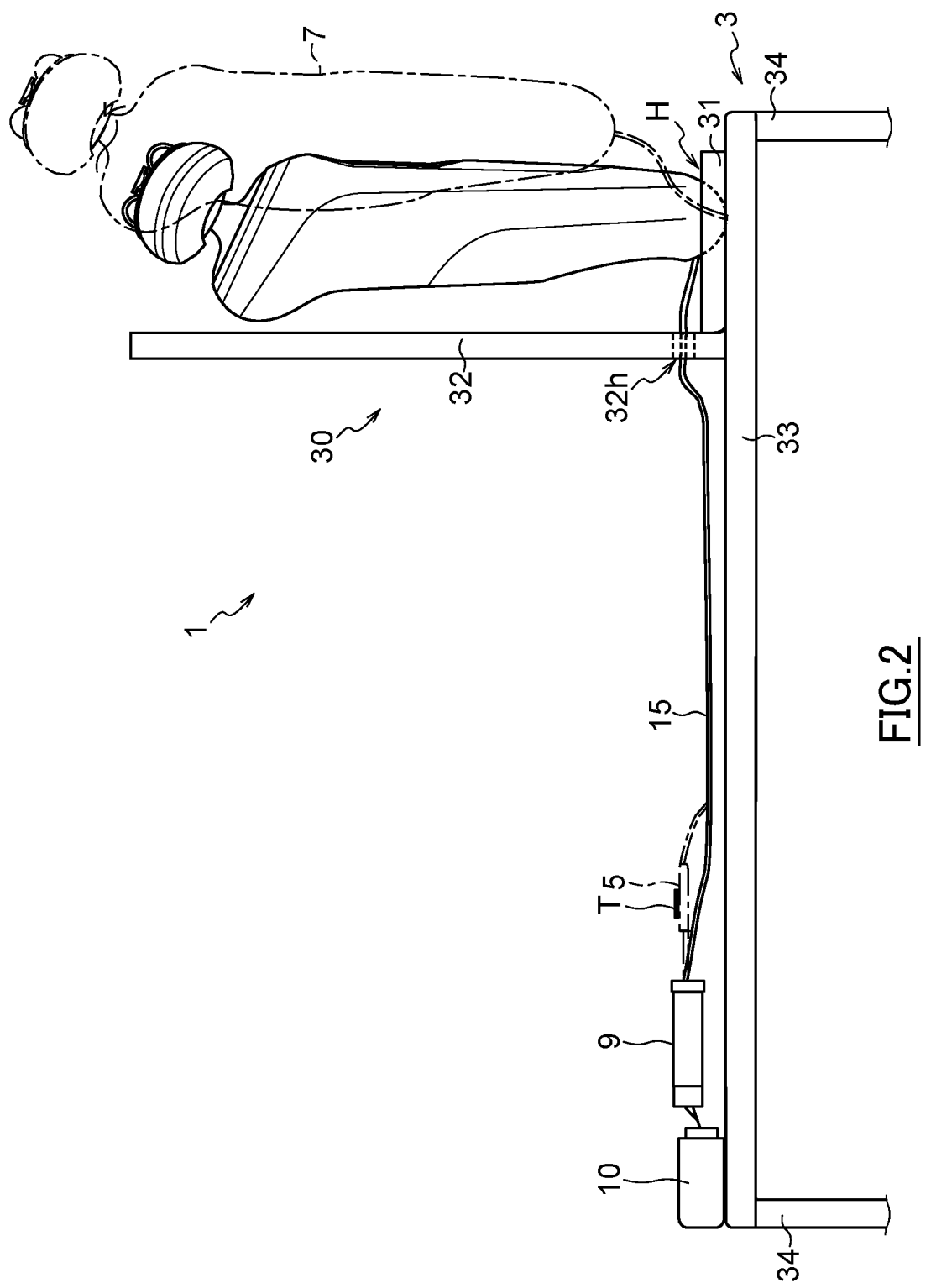
FIG. 2 is a side view of the product shelf on which the products are placed, in the system application example illustrated in FIG. 1.

FIG. 1 illustrates a state where six electric shavers as POSM products 7-1 to 7-6 are displayed on a product shelf 3 in such a way that the electric shavers are allowed to be tried out. FIG. 2 is a side view of the product shelf 3 on which the products are placed. In the following description, the products 7-1 to 7-6 are written as "products 7" when the products 7-1 to 7-6 are referred to in common.

As illustrated in FIG. 1, the six products 7-1 to 7-6 are accommodated in recesses H-1 to H-6 provided in the holders 30 of the product shelf 3, respectively. Labels PL1 to PL6 are arranged near the respective holders, for product explanation to customers. In the following description, the recesses H-1 to H-6 are written as "recesses H" when the recesses H-1 to H-6 are referred to in common.

FIG. 2 illustrates a state (solid lines) where the product 7 is held by the holder 30 and a state (imaginary lines) where the product 7 is detached from the holder 30, in a comparative manner, concerning the one product 7.

As illustrated in FIG. 2, the product shelf 3 includes legs 34, a base 33 supported by the legs 34, and the holder 30 fixed onto the base 33.

The holder 30 includes a support portion 31 and a backrest portion 32. The support portion 31 is provided for supporting a bottom of the product 7. The recess H is formed on the support portion 31. The backrest portion 32 is a plate-shaped member that extends upward from the support portion 31. The backrest portion 32 can support aback portion of the product 7.

As illustrated in FIG. 2, one end of a cord 15 (one example of the linear member) is attached to the bottom of the product 7. An opposite end of the cord 15 is attached to a cord winding device 10 (one example of an item attachment device). In one embodiment, the cord winding device 10 is fixed to the base 33 of the product shelf 3. The fixing method is not limited, and may be any of known fixing methods including fastening by double-sided tape, an adhesive, or a screw, for example.

The cord 15 and the cord winding device 10 are provided for each product 7. Accordingly, when the six products 7 are displayed as illustrated in FIG. 1, six sets of the cord 15 and the cord winding device 10 are provided.

The cord winding device 10 can wind the cord 15 and enables the cord 15 to be pulled out in such a way as to be extendable and retractable. A length of the cord 15 is set to an extent that allows a customer to sufficiently try out the product 7 when the customer picks up the product 7. When a customer picks up the product 7 at the holder 30, the cord 15 is pulled out from the cord winding device 10, and the product 7 can be detached from the holder 30 in a state where the cord 15 is attached to the product 7. When the product 7 is returned to the holder 30, the cord 15 is wound by the cord winding device 10.

As illustrated in FIG. 2, an Internet-of-things (IoT) tag T (one example of the communication device) is attached to a plate 5. The plate 5 is fixed to the cord 15.

The IoT tag is one example of an energy-harvesting communication device that collects radio waves in a surrounding environment and converts the collected radio waves into electric power, and that includes a capacitor storing the electric power. The IoT tag does not include a battery. In the following description, the IoT tag T is referred to simply as the tag T.

The tag T stores tag ID that differs for each product 7 connected to the cord 15 to which the tag T is attached. The tag ID is identification information of the tag T.

The maximum communication distance of the tag T is, but not limited to, a value in a range from 3 meters to 10 meters, for example. The tag T is configured to make wireless communication with low electric power consumption. Examples of a communication protocol for the tag T include Bluetooth (registered trademark) Low Energy (hereinafter, BLE), Bluetooth (registered trademark), and ZigBee (registered trademark). The following describes an exemplified case where the communication is made by BLE.

When the tag T is based on the standard of BLE, the tag T broadcasts an advertising packet (hereinafter, referred to simply as "packet") at a predetermined interval (e.g., every short period of approximately 1 second to approximately 10 seconds). The packet transmitted by the tag T includes at least the tag ID.

As illustrated in FIG. 1, a wireless device 2 for making BLE communication with the tag T associated with each product 7 is arranged near the product shelf 3. As described below, the wireless device 2 is a gateway device that can communicate with a tag management server (described below) via a network. As illustrated in FIG. 2, the wireless device 2 is arranged at a position where the wireless device 2 can receive packets transmitted from the respective tags in cases where the products are not arranged at the respective holders. In other words, the wireless device 2 is arranged by taking into consideration a radio wave output of each of the tags.

As the wireless device 2 is depicted by the imaginary lines in FIG. 1, an installation location of the wireless device 2 can be set arbitrarily.

As illustrated in FIG. 1, a reference tag Tref is preferably arranged on the product shelf 3. The reference tag Tref is a tag for reference, and is a device having the same configuration as that of the tag T associated with each product 7.

The reference tag Tref may be arranged at any location as long as the reference tag Tref can communicate with the wireless device 2 regardless of whether the products 7-1 to 7-6 are held by the associated holders. The reference tag Tref is provided for determining whether the wireless device 2 is operating normally. Particularly, as described below, in a state where all of the products 7-1 to 7-6 are held by the holders, the wireless device 2 cannot receive radio waves emitted from the tag T associated with each product 7 in some cases, and thus, it is difficult to determine whether the system is operating normally, if the reference tag Tref is not provided. In view of the above, the reference tag Tref that can communicate with the wireless device 2 regardless of whether the products 7-1 to 7-6 are held by the associated holders is provided. Thereby, it can be determined whether the system is operating normally.

Next, a configuration of the cord winding device 10 is described with reference to FIG. 3 and FIG. 4. FIG. 3 illustrates a plan view of the cord winding device 10 and the A-A sectional view. As illustrated in FIG. 3, the cord winding device 10 is substantially disk-shaped, and includes a periphery at which a protrusion 10d is provided. A penetration hole 10da for pulling out and winding the cord 15 is formed in the protrusion 10d.

As illustrated in the A-A section, the cord winding device 10 includes a cord winding portion 13 and a spiral spring 14 (one example of a biasing member). The cord winding portion 13 and the spiral spring 14 are provided in an accommodation space defined by a lower case 11 and an upper case 12. The cord winding portion 13 is configured to be rotatable around a spring support portion 11c. The spring support portion 11c protrudes from the center of a bottom of the lower case 11. One end of the cord 15 is attached to the cord winding portion 13. An outer peripheral groove 13d for winding the cord 15 is formed on the cord winding portion 13.

The spiral spring 14 includes one end supported by the spring support portion 11c. When the cord winding portion 13 rotates around the spring support portion 11c and the cord 15 is pulled out, the spiral spring 14 is wound up. Thus, when the cord 15 is pulled out, the biasing force is generated in a direction of winding the cord 15. As illustrated in FIG. 2, the biasing force acts in the direction (one example of a first direction) from the bottom of the product 7 toward the protrusion 10d of the cord winding device 10.

FIG. 4 illustrates plan views of the cord winding device 10 in a state where the cord 15 is not pulled out and in a state where the cord 15 is pulled out. FIG. 4 illustrates sections of the cord winding device 10. As illustrated in FIG. 4, in the state where the cord 15 is not pulled out, the spiral spring 14 is not wound up, and the restoring force of the spiral spring 14 does not act on the cord 15 or slightly acts on the cord 15. Meanwhile, in the state where the cord 15 is pulled out, the spiral spring 14 is wound up by pulling-out of the cord 15, and the restoring force F of the spiral spring 14 acts in the direction of winding the cord 15.

Next, a configuration of an accommodation member 9 (one example of a device accommodation part) is described with reference to FIG. 5. FIG. 5 includes a plan view, an arrow view, and a partially cutaway cross-sectional view of the accommodation member 9.

The accommodation member 9 is a member for accommodating the plate 5 to which the tag T is attached. The cord 15 is inserted through the accommodation member 9 as illustrated in FIG. 2.

As illustrated in the plan view and the arrow view of FIG. 5, the accommodation member 9 has a flat-plate form. The accommodation member 9 forms a cavity 9H inside. The plate 5 can be accommodated in the cavity 9H. The accommodation member 9 forms an opening 91a and an opening 91b. The plate 5 to which the tag T is attached enters into or exits from the cavity 9H through the opening 91a. The cord 15 passes through the opening 91b. A body 91 of the accommodation member 9 includes a bottom portion 911 and an upper portion 912 joined to each other to thereby form the cavity 91H. The bottom portion 911 and the upper portion 912 are made of resin for example, and are joined to each other by welding for example.

As can be clearly seen in the partially cutaway cross-sectional view in FIG. 5, the metal-containing members 92 are provided, in the cavity 9H, on each of the bottom portion 911 and the upper portion 912 of the body 91. The metal-containing members 92 are arranged near the centers of the bottom portion 911 and the upper portion 912 in the illustrated example as can be seen in the arrow view taken in the direction of the arrow X.

The metal-containing member 92 is, for example, a metal-deposited sheet including a transparent PET film, an aluminum vapor deposition layer (coating), a base material, and an adhesive that are layered on each other in this order. The metal-containing member 92 may be configured by sticking a foil sheet to a base material, or may be an aluminum foil.

The metal-containing member 92 is provided for selectively blocking communication of a communication antenna 42 of the tag T on the plate 5 when the plate 5 is accommodated in the accommodation member 9. Thus, the metal-containing member 92 is provided for exerting the electromagnetic shielding function of the metal-containing member 92 on the communication antenna 42.

A height of the cavity 9H is substantially uniform in the accommodation member 9 illustrated in FIG. 5, but is not limited to this. A height of the cavity 9H in a part at and near the opening 91a may be larger than a height of the cavity 91H in a remaining part to increase an area of the opening 91a. Thereby, the plate 5 can be smoothly accommodated into the cavity 9H.

Next, a relation between the plate 5 to which the tag T is attached and the accommodation member 9 in the product management system 1 is described with reference to FIG. 6 and FIG. 7.

Figure 6:
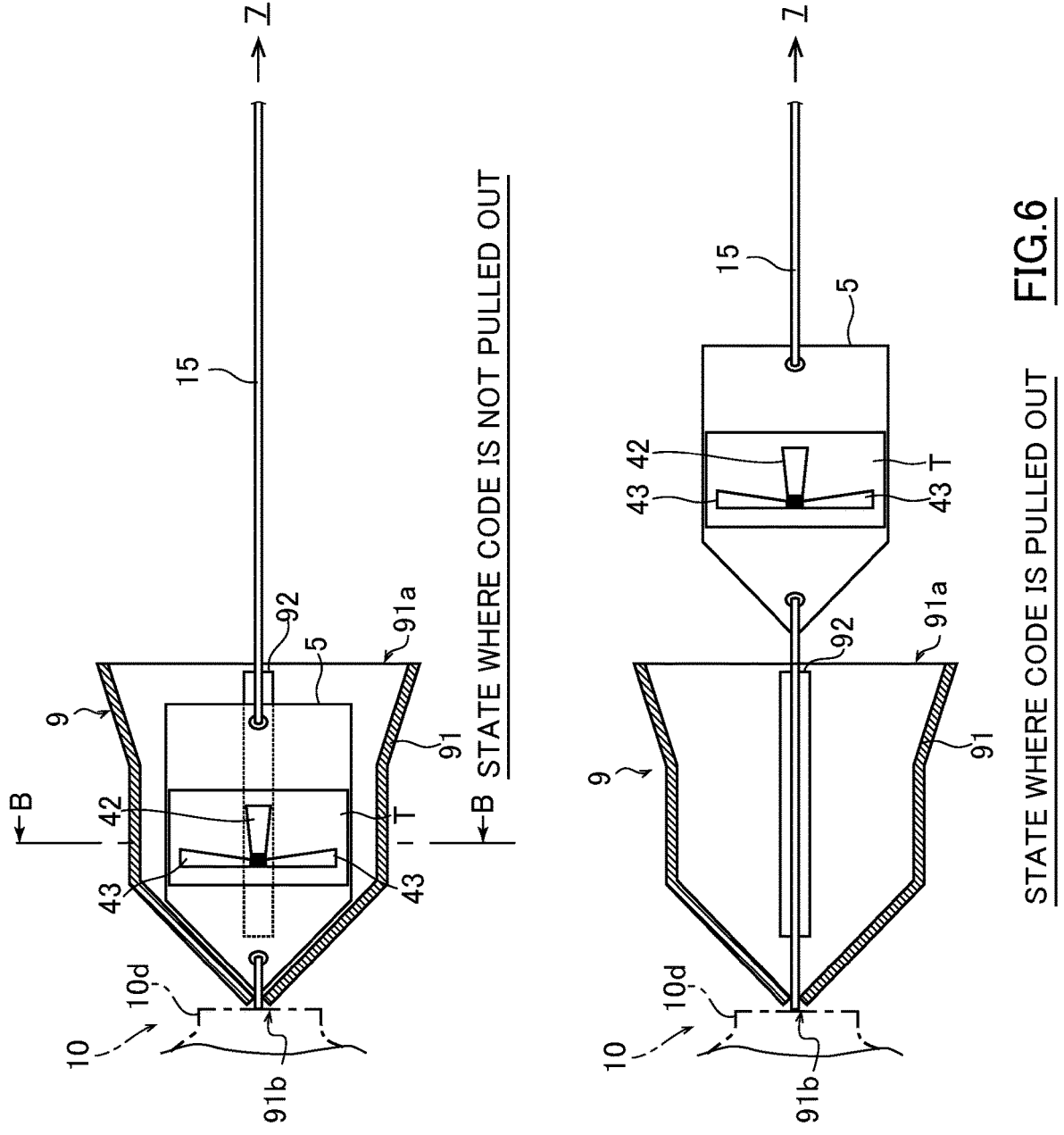
FIG. 6 illustrates positional relations between an IoT tag and the accommodation member in a state where the cord is not pulled out and in a state where the cord is pulled out, in the product management system according to one embodiment.
Figure 7:
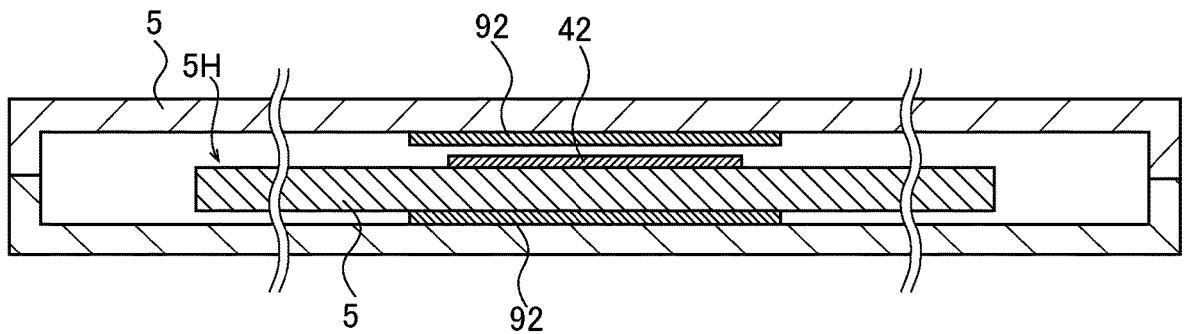
FIG. 7 is an enlarged cross-sectional view illustrating the B-B section in FIG. 6.

FIG. 6 illustrates positional relations between the tag T and the accommodation member 9 in a state where the cord 15 is not pulled out from the cord winding device 10 and in a state where the cord 15 is pulled out from the cord winding device 10. FIG. 6 illustrates the accommodation member 9 in a state where the upper portion 912 of the body 91 is removed in such a way that an inside of the accommodation member 9 can be seen clearly. FIG. 7 is an enlarged sectional view illustrating the B-B section in FIG. 6 in an enlarged manner.

As illustrated in FIG. 6, the plate 5 is attached to the cord 15. Although a method for attaching the cord 15 to the plate 5 is not particularly limited, the cord 15 may be fixed in a pair of holes formed in the plate 5 as illustrated in the drawing, or the cord 15 may be fixed to one surface of the plate 5 by adhesive tape or the like.

The tag T is stuck to one surface of the plate 5. The plate 5 is preferably made of hard cardboard or a plastic material of a relatively high rigidity in such a way that the tag T can smoothly enter an inside of the accommodation member 9 and can smoothly exit from the accommodation member 9.

The tag T includes the communication antenna 42, a pair of harvesting antennas 43, and an IC chip electrically connected to each of the antennas. The communication antenna 42 and a pair of the harvesting antennas 43 are each formed of conductive metal foil in a predetermined pattern. Each of the antennas and the IC chip of the tag T is mounted on a film-shaped base material. An adhesive is applied to the base material, and the tag T is stuck to the one surface of the plate 5 by the adhesive. FIG. 7 illustrates only the communication antenna 42 as the tag T.

The communication antenna 42 is an antenna for transmitting and receiving signals to and from the wireless device 2 in accordance with the BLE standard. The harvesting antenna 43 is an antenna that receives surrounding radio waves for energy harvesting. The harvesting antenna 43 is one example of an energy acquisition antenna.

The cord winding device 10, the tag T, and the accommodation member 9 constitute an item management device according to one embodiment.

When the product 7 is held by the holder 30, the cord 15 is in a state of being wound around the cord winding device 10 without being pulled out. In this state, as illustrated in FIG. 6, the plate 5 attached to the cord 15 has been accommodated into the accommodation member 9 by the restoring force for the cord 15 that is generated by the cord winding device 10. The restoring force acting on the plate 5 causes the plate 5 to be drawn to the protrusion 10d of the cord winding device 10.

As illustrated in FIG. 6, when the plate 5 is accommodated in the accommodation member 9, the communication antenna 42 of the tag T overlaps with the metal-containing members 92, but the harvesting antennas 43 of the tag T do not overlap with the metal-containing members 92. As illustrated in the cross-sectional view of FIG. 7, the communication antenna 42 of the tag T is covered with the metal-containing member 92 via the plate 5, and is close to the metal-containing members 92. Thereby, the electromagnetic shielding function of the metal-containing member 92 is selectively exerted only on the communication antenna 42 among the communication antenna 42 and a pair of the harvesting antennas 43.

Meanwhile, when the product 7 is detached from the holder 30, the cord 15 is in a state of being pulled out from the cord winding device 10. In this state, the plate 5 attached to the cord 15 has exited from the accommodation member 9, and the tag T on the plate 5 is exposed. Thereby, the electromagnetic shielding function of the metal-containing member 92 is not exerted on the communication antenna 42 of the tag T, and thus, the tag T can communicate with the wireless device 2.

Figure 8:
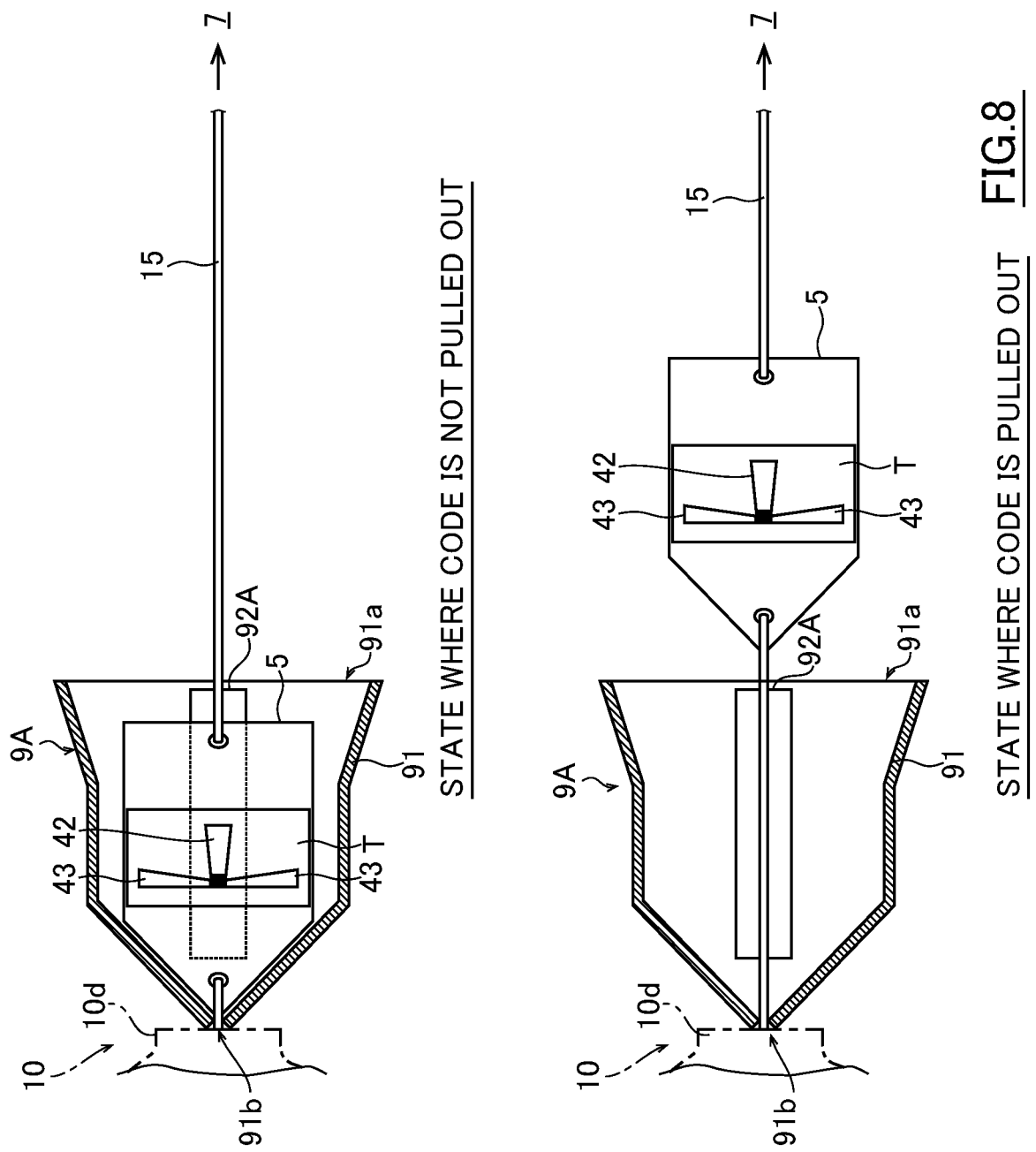
FIG. 8 illustrates positional relations between the IoT tag and the accommodation member in a state where the cord is not pulled out and in a state where the cord is pulled out, for the accommodation member including a metal-containing member whose shape is different from that in FIG. 6.

Similarly to FIG. 6, FIG. 8 illustrates positional relations between the tag T and the accommodation member 9A in a state where the cord 15 is not pulled out from the cord winding device 10 and in a state where the cord 15 is pulled out from the cord winding device 10. FIG. 8 differs from FIG. 6 in that a metal-containing member 92A of an accommodation member 9A illustrated in FIG. 8 is wider than the metal-containing member 92 of the accommodation member 9 in FIG. 6. In FIG. 8, in a state where the cord 15 is not pulled out, i.e., in a state where the plate 5 is accommodated in the accommodation member 9A, a pair of the harvesting antennas 43 of the tag T partially overlap with the metal-containing member 92A. However, even when a pair of the harvesting antennas 43 of the tag T partially overlap with the metal-containing member 92A, reception performance of the harvesting antennas 43 is not significantly degraded.

Next, a configuration of each device in the product management system 1 according to one embodiment is described with reference to FIG. 9.

Figure 9:
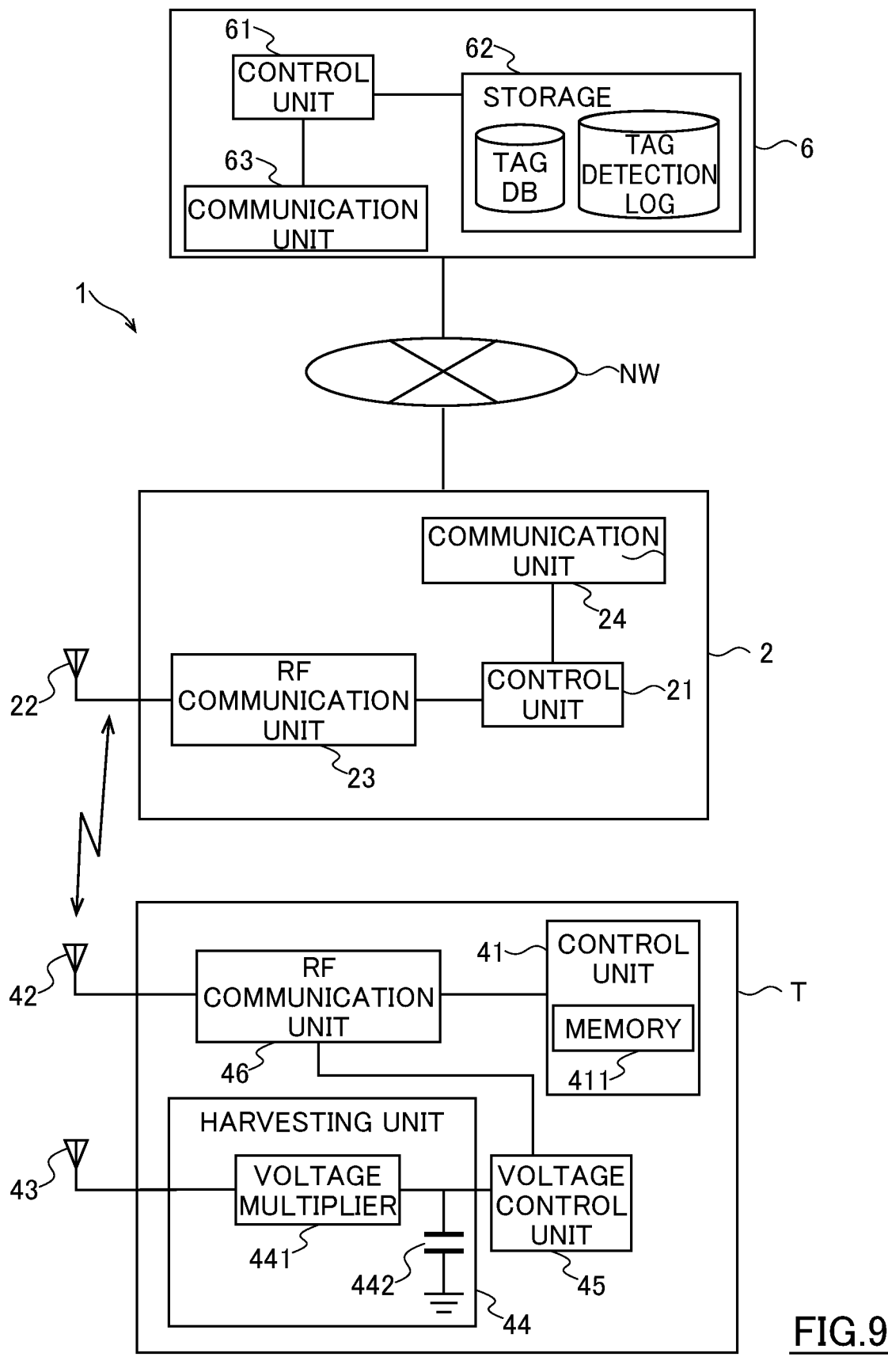
FIG. 9 is a block diagram illustrating an internal configuration of each device in the product management system according to one embodiment.

FIG. 9 is a block diagram illustrating an internal configuration of each device in the product management system 1 according to the present embodiment.

As illustrated in FIG. 9, the product management system 1 includes the wireless device 2 and the tag management server 6 (one example of a measurement device). The tag management server 6 can communicate with the wireless device 2 via the network NW. The network NW is, but not limited to, a local area network (LAN), a wide area network (WAN), a mobile communication network, the Internet, or the like, for example.

The wireless device 2 functions as a BLE wireless terminal that receives packets from the tag T and the reference tag Tref by the BLE communication. When the wireless device 2 receives a packet from each of the tags, the wireless device 2 transmits the tag ID included in the received packet to the tag management server 6.

When the tag T and the reference tag Tref are in a state of being able to normally transmit packets, the tag T and the reference tag Tref each transmit a packet at a predetermined interval. In response to this, the wireless device 2 also transmits the tag ID to the tag management server 6 at the predetermined interval.

Referring to FIG. 9, the tag T includes a control unit 41, the communication antenna 42, the harvesting antennas 43, a harvesting unit 44, a voltage control unit 45, and an RF communication unit 46. The control unit 41, the harvesting unit 44, the voltage control unit 45, and the RF communication unit 46 are mounted in the IC chip. Although the following describes the configuration of the tag T, the configuration of the reference tag Tref, which is not illustrated in FIG. 9, is the same as that of the tag T.

The control unit 41 includes a microprocessor and a memory 411. The control unit 41 controls the entire tag T. The memory 411 includes one or both of a random-access memory (RAM) and a read-only memory (ROM). The memory 411 stores programs executed by the microprocessor, and stores the tag ID that is identification information unique to the tag T.

The harvesting unit 44 harvests electric power from radio waves (e.g., radio waves generated by the surrounding wireless communication) in the surrounding environment received by the harvesting antennas 43. The harvesting unit 44 stores the generated electric power in an internal capacitor 442. In the present embodiment, for example, the harvesting unit 44 converts the radio signals received by the harvesting antennas 43 into a DC voltage by a voltage multiplier 441, and then stores the DC voltage in a capacitor 442. The voltage multiplier 441 may be, but not limited to, a Dickson voltage multiplier circuit (charge pump), for example. The capacitor 442 may be one (i.e., an on-die capacitor) configured on a semiconductor chip, or may be one formed separately from a semiconductor chip.

Radio waves used by the harvesting antennas 43 for electric power generation are radio waves in a plurality of different frequency bands within a wide frequency band. Examples of such radio waves include radio waves generated by the wireless communication in the frequency bands used in mobile communication systems of what are called 3G to 5G and the like, radio waves generated by the wireless communication in the frequency bands used in the communication standards such as Bluetooth (registered trademark) and Wi-Fi (registered trademark), radio waves generated by the wireless communication in the 2.4-GHz band represented by the communication protocols such as ZigBee (registered trademark), Thread, and the like, and radio waves generated by the wireless communication in the frequency bands (e.g., the 900-MHz band and the 13.56-MHz band) used in the RFID.

The voltage control unit 45 supplies an operation voltage to the control unit 41 and the RF communication unit 46. The voltage control unit 45 monitors a voltage of the capacitor 442, and switches a power mode, depending on the monitored result.

For example, when a voltage of the capacitor 442 is lower than a predetermined value, the voltage control unit 45 sets the power mode to be a first mode of operating only the minimum circuitry. In this case, the control unit 41 and the RF communication unit 46 cease generation of a packet, transmission of a radio signal, and the like. When a voltage of the capacitor 442 becomes equal to or higher than the predetermined value by charging the capacitor 442, the voltage control unit 45 sets the power mode to be a second mode of executing a normal processing routine. In this case, the control unit 41 and the RF communication unit 46 perform various pieces of processing including generation of a packet and transmission of a radio signal.

The RF communication unit 46 applies predetermined digital modulation (e.g., the Gaussian frequency shift keying (GFSK)) to a transmission-target packet (baseband signal). Then, the RF communication unit 46 applies orthogonal modulation to the digital-modulated packet, and sends the high-frequency signal (a signal in the 2.4-GHz frequency band in a case of BLE) to the communication antenna 42.

The communication antenna 42 transmits the high-frequency radio signal (packet) sent by the RF communication unit 46.

The tag T may include a sensor that detects movement of the tag T or an ambient temperature. In this case, the packet transmitted from the tag T to the wireless device 2 includes data detected by the sensor.

As illustrated in FIG. 9, the wireless device 2 includes a control unit 21, an antenna 22, an RF communication unit 23, and a communication unit 24.

The control unit 21 is constituted mainly by a microprocessor. The control unit 21 controls the entire wireless device 2. For example, when the control unit 21 acquires tag ID from a packet received from the tag T, the control unit 21 controls the communication unit 24 to transmit the acquired tag ID to the tag management server 6. When the packet includes data detected by the sensor of the tag T, the tag ID and the detected data are transmitted to the tag management server 6 in association with each other.

The RF communication unit 23 demodulates the radio signal received by the antenna 22 from the tag T to convert the radio signal into the baseband signal. Then, the RF communication unit 23 applies predetermined digital demodulation to the baseband signal to receive the packet. In order to transmit a beacon signal from the antenna 22, the RF communication unit 23 applies orthogonal modulation to a baseband signal of a predetermined pattern, for example, and sends the orthogonal-modulated signal to the antenna 22.

The communication unit 24 functions as a communication interface for communicating with the tag management server 6.

As illustrated in FIG. 9, the tag management server 6 includes a control unit 61, a storage 62, and a communication unit 63, for example.

The control unit 61 is constituted mainly by a microprocessor. The control unit 61 controls the entire tag management server 6.

The storage 62 includes a large-scale storage device such as a hard disk drive (HDD). The storage 62 stores a tag database (tag DB). The tag database includes the tag ID of the tag T and a product code of the product 7 that is held by the recess H and that is associated with the tag T, in such a way that the tag ID is associated with the product code. The storage 62 also stores the tag ID of the reference tag Tref.

The communication unit 63 functions as a communication interface for communicating with the wireless device 2.

The control unit 61 executes a server program. Thereby, when the wireless device 2 receives packets transmitted by the tag T and the reference tag Tref and including the tag IDs, the control unit 61 acquires, from the wireless device 2, the tag IDs included in the packets.

Each time the control unit 61 acquires, from the wireless device 2, the tag ID included in the tag database, the control unit 61 records, in the storage 62, as a tag detection log, the acquired tag ID and a time point at which the control unit 61 acquires the tag ID. In other words, the control unit 61 acquires a result of whether the wireless device 2 can communicate with the tag T over time. Based on the tag detection logs, the control unit 61 performs processing of totaling the number of times the tag is detected, for each predetermined time period. Thus, the control unit 61 measures a frequency at which the product of the specific product code is picked up by a customer. At this time, the product code associated with the tag ID is identified by referring to the tag database.

A timing of performing the totaling processing can be arbitrarily set. In one example, a result of whether the wireless device 2 can communicate with the tag T over time is recorded as tag detection logs during opening hours of the store in one day. Then, at a timing after the opening hours end, the totaling processing is performed based on the tag detection logs. In other words, the control unit 61 functions as a measurement device that measures a frequency at which the wireless device 2 becomes able to communicate with the tag T (i.e., a frequency at which the associated product 7 is picked up by a customer), based on the results of whether the wireless device 2 can communicate with the tag T.

Similarly, each time the control unit 61 acquires the tag ID of the reference tag Tref from the wireless device 2, the control unit 61 records, in the storage 62, as a tag detection log, the acquired tag ID and a time point at which the control unit 61 acquires the tag ID.

As illustrated in FIG. 1, the reference tag Tref is not shielded. Thus, unless the wireless device 2 is malfunctioning, the control unit 61 can acquire the tag ID of the reference tag Tref at the predetermined interval at which the reference tag Tref transmits a packet. When the control unit 61 cannot acquire the tag ID of the reference tag Tref at the predetermined interval, the control unit 61 determines that the wireless device 2 is malfunctioning, and notifies an unillustrated administrator terminal of the determined result.

Next, operation of the item management device according to one embodiment is described with reference again to FIG. 6.

As described above, when the product 7 is held by the holder 30, the cord 15 is in a state of being wound around the cord winding device 10 without being pulled out. In this state, the electromagnetic shielding function of the metal-containing member 92 is selectively exerted only on the communication antenna 42 among the communication antenna 42 and a pair of the harvesting antennas 43. For this reason, even when the tag T transmits a packet from the communication antenna 42, the packet is shielded by the metal-containing member 92, or a transmission frequency becomes significantly small. Meanwhile, the harvesting antennas 43 are not shielded, and thus, the harvesting antennas 43 can receive surrounding radio waves and keep a voltage of the capacitor 442 (refer to FIG. 9) equal to or higher than the predetermined value. Accordingly, the second mode of executing the normal processing routine can be maintained.

When the product 7 held by the holder 30 is detached from the holder 30, the cord 15 is pulled out from the cord winding device 10, and the tag T on the plate 5 is exposed. In this case, a voltage of the capacitor 442 has been kept equal to or higher than the predetermined value since the tag T was accommodated in the accommodation member 9. Thus, a packet can be transmitted from the communication antenna 42 immediately after the tag T of the plate 5 becomes exposed. In other words, communication of the tag T with the wireless device 2 can be resumed in a practically non-problematic short time after the communication antenna 42 is stopped from being covered with the metal-containing member 92.

As described above, the communication control method for the tag T in one embodiment includes the following steps of.

(i) blocking communication of the tag T with the wireless device 2 by causing the metal-containing member 92 to be close to the communication antenna 42 among a plurality of the antennas of the tag T, or by covering at least a part of the communication antenna 42 with the metal-containing member 92;

(ii) charging the capacitor 442 by the tag T, based on energy harvested by the harvesting antennas 43, regardless of whether the tag T can communicate with the wireless device 2, and thereby keeping a voltage of the capacitor 442 equal to or higher than the predetermined value; and (iii) resuming communication of the tag T with the wireless device 2 when the metal-containing member 92 is stopped from being close to the communication antenna 42 or when at least a part of the communication antenna 42 is stopped from being covered with the metal-containing member 92.

In this manner, the metal-containing member 92 selectively shields only the communication antenna 42 among a plurality of the antennas of the tag T. Thus, even while the communication antenna 42 is shielded, a voltage of the capacitor 442 can be kept equal to or higher than the predetermined value, and the tag T can be maintained in a state of executing the normal processing routine. For this reason, the tag T can transmit a packet to the wireless device 2 immediately after the communication antenna 42 is stopped from being shielded by the metal-containing member 92. In other words, the communication control method for the tag T according to one embodiment can improve communication responsiveness to shielding or un-shielding against radio waves emitted by the tag T.

When the tag T includes the sensor, even while the communication antenna 42 is shielded, the sensor may operate and store, in the memory, the detected data for each detection time point. In this case, after the communication antenna 42 is stopped from being shielded, the tag T transmits, to the wireless device 2, a packet including the detection time points and the detected data acquired while the communication antenna 42 is shielded.

The metal-containing member provided at the accommodation member may take a variety of forms.

Figure 10:
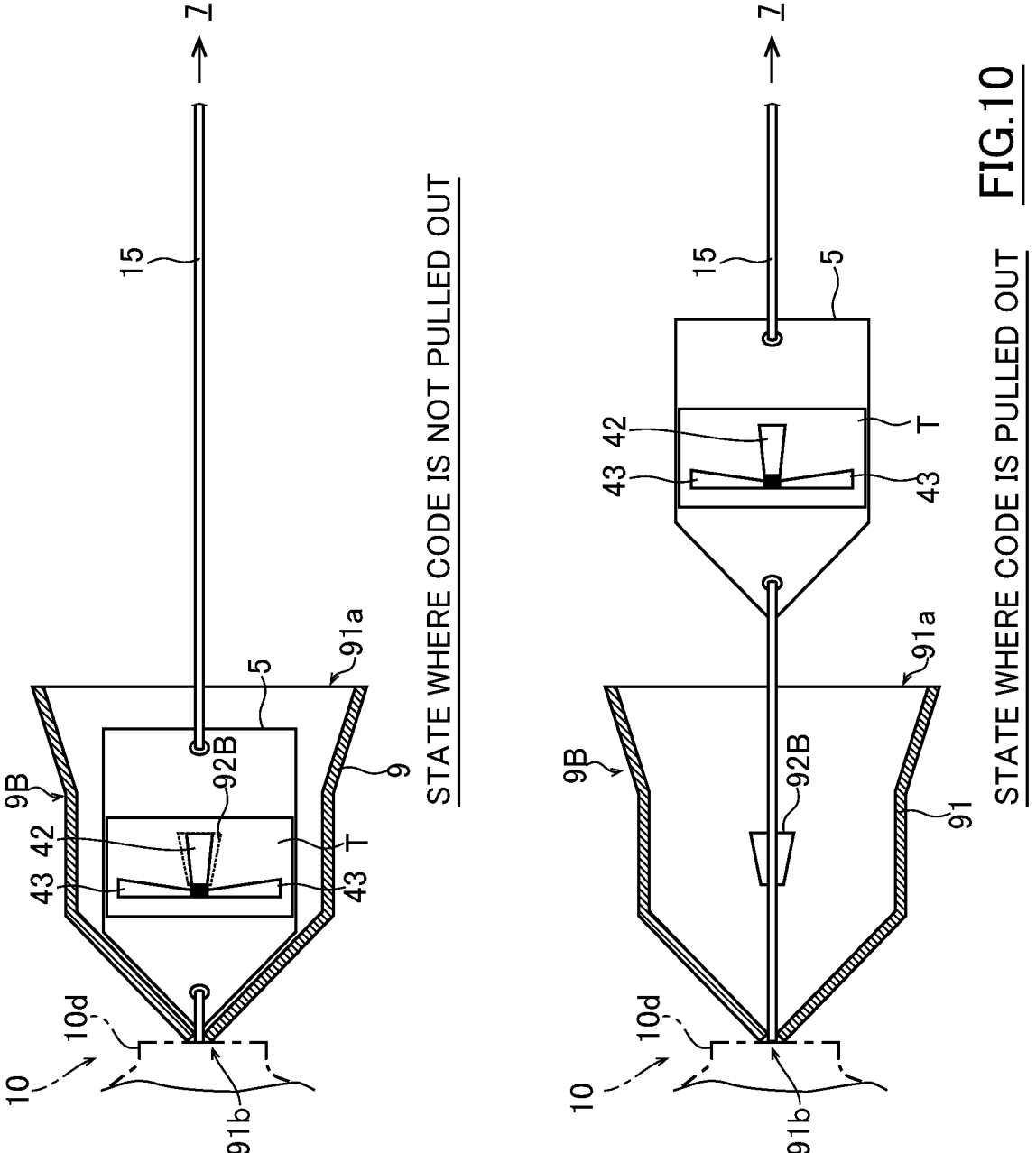
FIG. 10 illustrates positional relations between the IoT tag and the accommodation member in a state where the cord is not pulled out and in a state where the cord is pulled out, for the accommodation member including a metal-containing member whose shape is different from that in FIG. 6.

FIG. 10 illustrates positional relations between the tag T and an accommodation member 9B in a state where the cord is not pulled out and in a state where the cord is pulled out, for the accommodation member 9B including a metal-containing member 92B having a shape different from that illustrated in FIG. 6. The metal-containing member 92B illustrated in FIG. 10 has a shape that conforms to a shape of the communication antenna 42 of the tag T. The metal-containing member 92B covers only the communication antenna 42 in a state where the plate 5 is accommodated in the accommodation member 9B.

As exemplified in FIG. 10, the metal-containing member may take a variety of forms, depending on a form of the communication antenna of the tag T.

Figure 11:
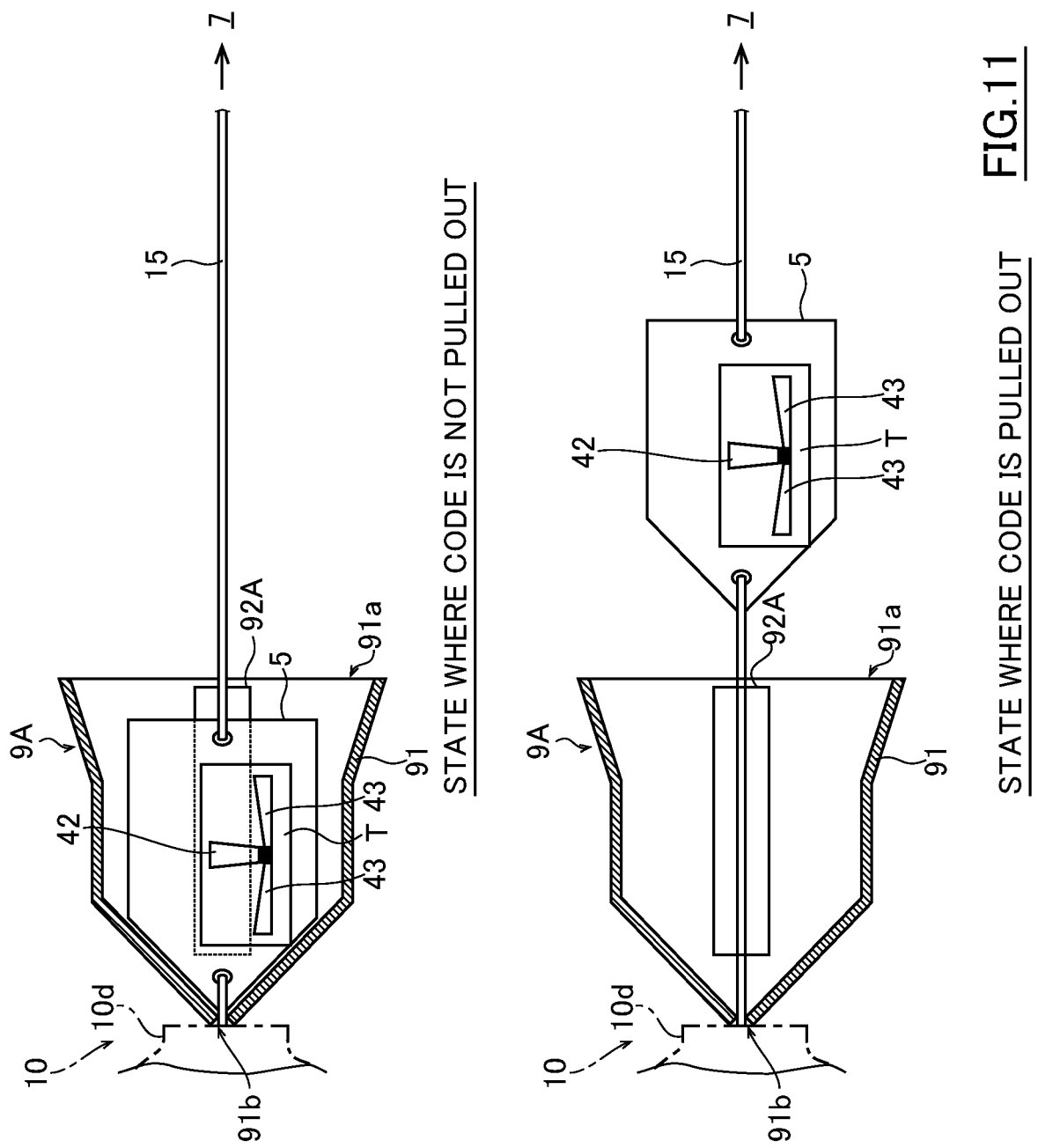
FIG. 11 illustrates positional relations between the IoT tag and the accommodation member in a state where the cord is not pulled out and in a state where the cord is pulled out, when the IoT tag on a plate is placed in an orientation different from that in FIG. 8.

Arrangement of the tag T may be adjusted on the plate 5 in order to effectively cover the communication antenna 42 of the tag T. For example, FIG. 11 illustrates positional relations between the IoT tag and the accommodation member in a state where the cord is not pulled out and in a state where the cord is pulled out, when the IoT tag on the plate 5 is placed in an orientation different from that in FIG. 8. In the state where the plate 5 illustrated in FIG. 11 is accommodated in the accommodation member 9A. the band-shaped metal-containing member 92A can effectively cover the communication antenna 42 without covering the harvesting antennas 43. In other words, a stuck position of the tag T on the plate 5 may be appropriately adjusted from the standpoint of effectively covering only the communication antenna 42.

Although the embodiments of the communication control method for the communication device, the item management device, and the item management system according to the present invention are described above, the present invention is not limited to the above-described embodiments. The above-described embodiments can be variously improved or modified within a range that does not depart from the essence of the present invention.

In the above-described embodiment, a POSM is cited as an example of an item, and the described system is one that measures a frequency at which the POSM is picked up by a customer in the store. However, an application example of the communication control method for the communication device according to the present invention is not limited to this. In another application example, a system may be configured in such a way that the tag is stuck to a cover of a container, and closing of the cover results in that the metal-containing member selectively covers only the communication antenna of the tag. Thereby, the system can accurately measure the timings and frequency at which the container is used. When the tag includes a temperature sensor, the system can collect data of temperatures when the container is used.

In the above-described case in the above-described embodiment, communication of the tag T with the wireless device 2 is blocked by causing the metal-containing member to be close to the communication antenna 42 of the tag T or by covering at least a part of the communication antenna 42 with the metal-containing member. However, there is no limitation to this.

Even in a case of using radio waves shield member instead of the metal-containing member, communication of the tag T with the wireless device 2 is blocked by causing the radio wave shield member to be close to the communication antenna 42 of the tag T or by covering at least a part of the communication antenna 42 with the radio wave shield member, so that the similar effect can be achieved.

The radio wave shield member is not limited to one that shields radio waves emitted from the communication antenna 42 of the tag T, and may be a radio wave absorbing body that absorbs radio waves emitted from the communication antenna 42.

The radio wave absorbing body is not particularly limited. Examples of the radio wave absorbing body include a body (that includes foaming polystyrene as abase material and uses ohmic loss of carbon) formed of a combination of carbon and foaming polystyrene, a body (that uses magnetic loss of ferrite) formed of a combination of ferrite and an inorganic material, a body formed of a combination of carbon and foaming polyethylene, a body (e.g., formed of a mixture of synthetic rubber and ferrite powder, or a mixture of synthetic rubber and carbonyl iron powder) formed of a combination of a magnetic material and synthetic rubber, a ferrite sintered body, a body formed of a combination of glass cloth reinforced aluminum foil and an electrically conductive adhesive layer, and a body including a layer of a dielectric material.

The radio wave shield member may be a member that changes a frequency of radio waves emitted from the communication antenna 42, to an unintended frequency causing communication with the wireless device 2 to become impossible. The electromagnetic shield member may be a member that superimposes noise on radio waves emitted from the communication antenna 42, in such a way as to inhibit communication with the wireless device 2.

The present invention is related to the patent application of Japanese Patent Application No. 2022-60052 filed with the Japan Patent Office on Mar. 31, 2022, the entire contents of which are incorporated by reference into the description of the present application.

The invention claimed is:

1. A communication control method for a communication device that includes a plurality of antennas and a capacitor, the plurality of antennas including a communication antenna for communicating with a wireless device and an energy acquisition antenna for acquiring energy from surrounding radio waves, the capacitor being charged based on energy acquired by the energy acquisition antenna, wherein the communication device communicates with the wireless device when a voltage of the capacitor is equal to or higher than a predetermined value, the method comprising:

blocking communication of the communication device with the wireless device by causing a metal-containing member to be close to the communication antenna among the plurality of antennas, or by covering at least a part of the communication antenna with the metal-containing member;

charging the capacitor by the communication device, based on energy acquired by the energy acquisition antenna, regardless of whether the communication device can communicate with the wireless device, and thereby keeping a voltage of the capacitor equal to or higher than the predetermined value; and resuming communication of the communication device with the wireless device, when the metal-containing member is stopped from being close to the communication antenna, or when at least a part of the communication antenna is stopped from being covered with the metal-containing member.

2. The communication control method according to claim 1, wherein the communication device includes a sensor that detects movement of the communication device or an ambient temperature, and the method comprising, by the wireless device, communicating with the communication device, and thereby acquiring data detected by the sensor.

3. The communication control method according to claim 1, wherein communication between the communication device and the wireless device is made in accordance with Bluetooth (registered trademark) Low Energy.

4. A communication control method for a communication device that includes a plurality of antennas and a capacitor, the plurality of antennas including a communication antenna for communicating with a wireless device and an energy acquisition antenna for acquiring energy from surrounding radio waves, the capacitor being charged based on energy acquired by the energy acquisition antenna, wherein the communication device communicates with the wireless device when a voltage of the capacitor is equal to or higher than a predetermined value, the method comprising:

blocking communication of the communication device with the wireless device by causing a radio wave shield member to be close to the communication antenna among the plurality of antennas, or by covering at least a part of the communication antenna with the radio wave shield member;

charging the capacitor by the communication device, based on energy acquired by the energy acquisition antenna, regardless of whether the communication device can communicate with the wireless device, and thereby keeping a voltage of the capacitor equal to or higher than the predetermined value; and resuming communication of the communication device with the wireless device when the radio wave shield member is stopped from being close to the communication antenna or when at least a part of the communication antenna is stopped from being covered with the radio wave shield member.

5. The communication control method according to claim 4, wherein the radio wave shield member is a radio wave absorbing body.

6. The communication control method according to claim 4, wherein the communication device includes a sensor that detects movement of the communication device or an ambient temperature, and the method comprising, by the wireless device, communicating with the communication device, and thereby acquiring data detected by the sensor.

7. An item management device comprising:

an item attachment device including a linear member and a biasing member, the linear member having one end that is attached to an item, the biasing member biasing the linear member from the one end in a first direction;

a communication device attached to the linear member; and a device accommodation part that can accommodate the communication device and includes a metal-containing member fixed inside, wherein

US 12,688,391 B2

15 the communication device comprises a plurality of antennas and a capacitor, the plurality of antennas including a communication antenna for communicating with a wireless device and an energy acquisition antenna for acquiring energy from surrounding radio waves, the capacitor being charged based on energy acquired by the energy acquisition antenna, wherein the communication device communicates with the wireless device when a voltage of the capacitor is equal to or higher than a predetermined value, when external force is not applied to the item against biasing force in the first direction generated by the biasing member, the communication device is accommodated in the device accommodation part, and when external force is applied to the item against the biasing force in the first direction generated by the biasing member, the communication device is enabled to exit from the device accommodation part, and the item management device is configured in such a way that when the communication device is accommodated in the device accommodating part, the communication antenna among the plurality of antennas is close to the metal-containing member, or at least a part of the communication antenna is covered with the metal-containing member.

8. An item management system comprising:
the item management device according to claim 7;

a wireless device wirelessly communicating with the communication device; and a measurement device configured to acquire a result of whether communication by the wireless device with the communication device is possible over time, and, based on the result, measure a frequency at which the wireless device is able to communicate with the communication device.

9. The item management device according to claim 7, wherein the communication device includes a sensor that detects movement of the communication device or an ambient temperature, and the wireless device is configured to communicate with the communication device to acquire data detected by the sensor.

10. An item management system comprising:
the item management device according to claim 9;

a wireless device wirelessly communicating with the communication device; and a measurement device configured to acquire a result of whether communication by the wireless device with the communication device is possible over time, and, based on the result, measure a frequency at which the wireless device is able to communicate with the communication device.

* * * * *